INVENTOR
Marcel Mamy
By Paul M. Craig, Jr.
ATTORNEY

INVENTOR
Marcel Mamy
By Paul M. Craig, Jr.
ATTORNEY

PNEUMATIC SWITCHING MEMBER

Filed Sept. 16, 1963 4 Sheets-Sheet 3

INVENTOR
Marcel Mamy
By Paul M. Craig, Jr.
ATTORNEY

INVENTOR
Marcel Mamy
By Paul M. Craig, Jr.
ATTORNEY

United States Patent Office 3,303,999
Patented Feb. 14, 1967

3,303,999

PNEUMATIC SWITCHING MEMBER

Marcel Mamy, 11 bis, Rue Roquepine, Paris, France

Filed Sept. 16, 1963, Ser. No. 309,079
Claims priority, application France, Sept. 18, 1962, 909,775
10 Claims. (Cl. 235—201)

The advantage of the use of compressible or incompressible fluids, such as air or oil, for the transmission of information requires no further proof and many processes and industrial installations now utilise hydraulic or pneumatic members for continuous control and regulation.

The position occupied by these pneumatic or hydraulic systems, despite the development of corresponding electronic systems, is justified for a number of reasons:

The processes to be controlled often possess the characteristics of low-pass filters, the response times of the controllers being negligible as compared with the correction times of the controlled installations.

The control members are simple, robust and sufficiently accurate, while providing high power gains for reasonable energy consumption, cost and maintenance.

Pneumatic or hydraulic elements are not attended by certain disadvantages inherent in electric systems, such as, for example, arcing or the necessity to keep the operating temperatures at a relatively low level.

The object of this invention is to contribute to the development of industrial sequentially acting logical and automatic control systems.

An elemental diaphragm-type pneumatic switching member is known which comprises four successive chambers separated by three parallel diaphragms. These diaphragms are mechanically connected together by a shaft, the assembly forming a unit movable in the direction of the shaft. Each chamber is connected to a pressurised-fluid pipe, the said fluid generally being compressed air which supplies a particular control signal. The movable unit is disposed between two nozzles through which an operating signal passes and which are alternately closed by the movable unit, depending upon the position of the latter. The surfaces of the diaphragms separating the chambers may be varied by the positioning of diaphragms which reduce the active surface of the movable diaphragm. In this four-chamber member, the two central chambers are, for example, separated from one another by a central diaphragm of large surface, these central chambers being separated from the respective end chambers by diaphragms of smaller surface than the central diaphragm. Each chamber, therefore, comprises either one diaphragm or two diaphragms, the latter two having different surfaces. A pressure introduced into one of these two-diaphragm chambers will, therefore, generate a force which will be proportional to the surface difference of the two diaphragms and directed towards the larger of the two surfaces. The resultant of the forces applied to all the diaphragms will, therefore, determine the direction of movement of the movable unit, so that the nozzle will be closed.

These four-chamber pneumatic members, in combination with other particular pneumatic members, make it possible to provide the majority of the logical elements generally employed in pneumatic computers and industrial sequentially operating automatic control systems.

However, these four-chamber members have the disadvantage that they necessitate the use of other members based upon different structures, so that complete standardisation of the elements is not possible. Moreover, some logical circuits necessitate too many four-chamber elements, which increases the overall size of the apparatus.

The object of this invention is to contribute to the provision of logical systems and industrial sequentially operating automatic systems based upon a minimum number of standard pneumatic elements.

The present invention concerns an elemental pneumatic cell of the type comprising diaphragms bounding internal chambers connected to external ducts, a movable unit and nozzles connected to external ducts, the said nozzles being adapted to be closed by the movable unit.

The elemental pneumatic cell according to the invention has the advantage that it can be employed alone to perform the functions of a relay, a switch, a discriminator or a comparator for logical signals and all basic functions of logical discrete-signal structures.

When employed in combination with a very limited number of particular pneumatic elements such as pneumatic resistances and capacitances, this cell solves all the problems of automatic control which necessitate both elements performing elemental logical operations and elements involving a time factor. Thus, it is possible by combining these various circuits to build up universal elements such as the McCullough and Fitts neuron.

The elemental pneumatic cell according to the invention is distinguished notably in that it comprises at least six chambers separated by diaphragms having alternately large and small active areas or surfaces, one of the said chambers being constantly connected to a return pressure source of constant value lower than the value of the fluid supply pressure of the pneumatic element.

Another object of the invention resides in the connection of the elemental cell as a comparison member which compares the variable pressures with a predetermined value of the return pressure.

A third object of the invention is the connection of the cell as a memory or storage cell for registering a signal and restituting it by the action of a return-to-zero signal.

Further objects and features of the invention will become apparent in the course of the following description.

The following description of the invention will comprise a detailed description of the structure of the cell according to the invention, a study of the possibilities offered by this cell in the performance of a number of basic elemental operations and a study of a number of more complex pneumatic circuits which illustrate with particular clarity the advantages afforded by the cell according to the invention.

It is to be understood that these embodiments are here referred to purely by way of illustrative and non-limiting examples, because it is obvious that the possible combinations with cells according to the invention and a number of other pneumatic members may be multiplied ad infinitum for the purpose of resolving any given problem, and that any operation, no matter how complex, will always be reduced, by analytical decomposition, to the combination of a limited number of elemental operations.

Also, in order more clearly to illustrate the invention, we shall set out a priori a number of particulars, which have no limiting character.

Figure 15A:
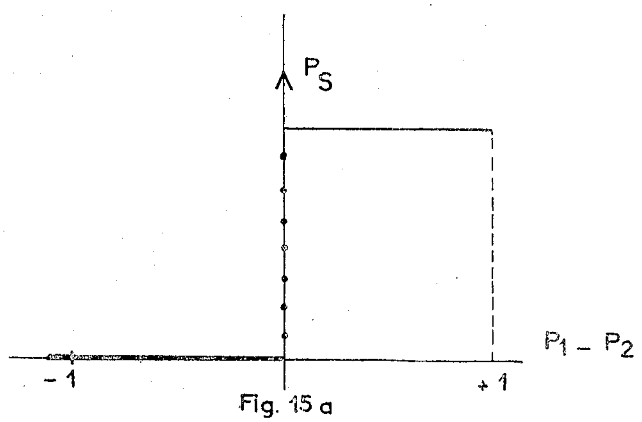
Figure 15B:
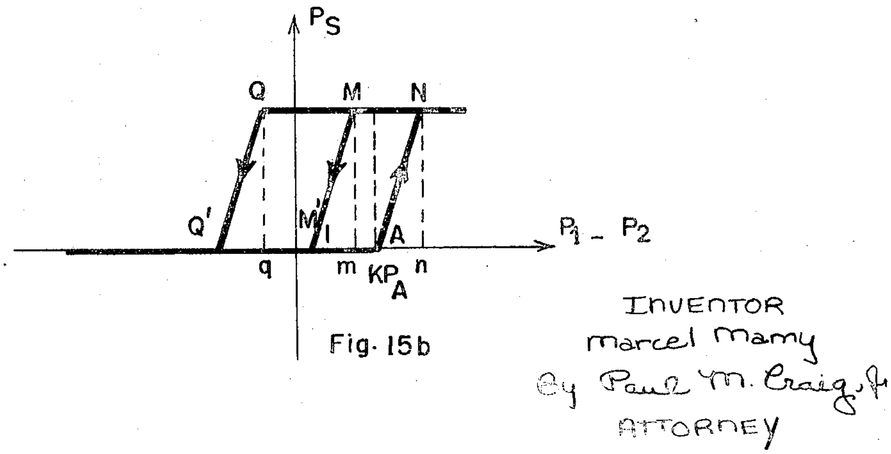

FIGURES 15*a* and 15*b* represent characteristic curves of a comparator comprising a four-chamber cell and of a comparator comprising a six-chamber cell according to the invention.

Figure 14:
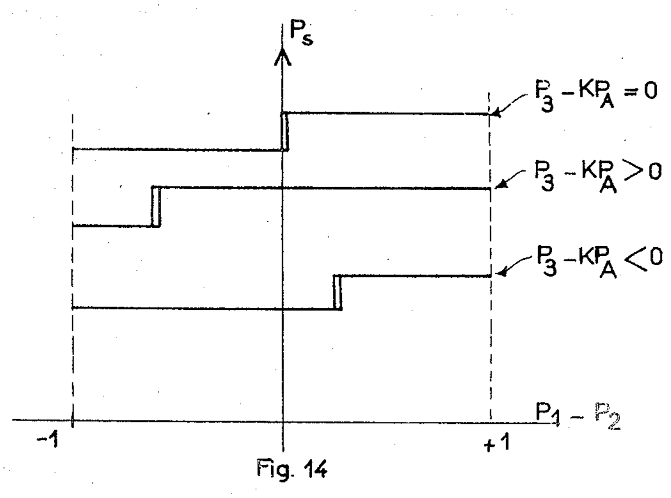

FIGURE 14 illustrates the system of characteristic curves which may be obtained with a comparator having a six-chamber cell according to the invention.

Figure 1:
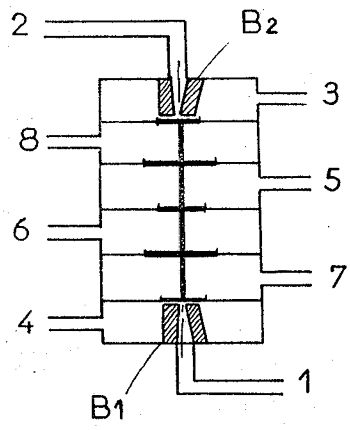
FIGURE 1 illustrates diagrammatically a cell according to the invention.

FIGURE 1 is a diagrammatic representation of a cell according to the invention. This cell comprises six chambers each connected to a compressed-air duct and numbered 3 to 8, the said chambers being respectively separated by five diaphragms. These diaphragms, in the described examples, have alternately and successively a surface or active area of value $s$ and a surface or active area of value S, S being greater than $s$. In FIGURE 1, the active or flexible area of the diaphragms is shown in heavy line as forming the center portion of each diaphragm.

Situated opposite the first diaphragm is the opening of the nozzle $B_2$ fed by a compressed-air duct 2 at the pressure $P_A$.

Situated opposite the last diaphragm is the aperture of the nozzle $B_1$ connected to a duct 1 through which the output signal passes.

According to the invention, the cell comprises a return system which acts on the movable unit and imparts thereto, in the inoperative state, a predetermined position. This return system consists of a force applied to the movable unit by a constant pressure of value $kP_A$ introduced into at least one of the six chambers of the cell. $P_A$ being the value of the supply pressure of the cell, $k$ is a coefficient lower than 1, chosen as a function of the ratio of the surfaces $s$ and S. The pressures introduced into the chambers, or control pressures, will be called P and will be accompanied by indices as long as $Ps$ represents the output pressure. The atmospheric pressure will be taken as the reference pressure and will be symbolically represented in the figures by the symbol "reference potential" or "earth" of electric circuit diagrams. The positive direction chosen for orienting the various forces exerted on the diaphragms is that of an arrow which extends from the nozzle $B_1$ towards the nozzle $B_2$. For the sake of clarity of the text, a distinction will be drawn between the four chambers 5, 6, 7 and 8 which serve more particularly for the control of the movable unit. A positive force will be exerted on the movable unit on application of pressure to the chambers 7 and 5, called the odd chambers, while a negative force will be exerted on the movable unit on application of pressure to the chambers 8 and 6, called the even chambers.

Figure 3:
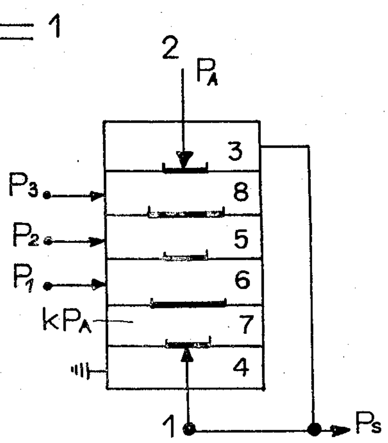
FIGURE 3 is an example of the application of the invention to the analogue comparison of pressures.

FIGURE 3 is an example of the use of the cell for the comparison of analogue signals. The chamber 3 is connected to the output duct 1. The chamber 4 is connected to atmospheric pressure, an odd chamber, for example the chamber 7, is connected to the constant pressure $kP_A$, and three control pressures $P_1$, $P_2$ and $P_3$ may be transmitted respectively to the last three free chambers 6, 5 and 8.

The resultant F of the pressure forces will be:

$$F \cong kP_A(S-s)+P_1(s-S)+P_2(S-s)+P_3(s-S), \text{ or}$$
$$F \cong (S-s)[kP_A-(P_1+P_3-P_2)]$$

It will thus be seen that the direction of the force will depend upon the comparison between the value of the constant pressure $kP_A$, fixed at will, and of the sum $$P_1+P_3-P_2$$

of three pressures which vary in time. When $$P_1+P_3-P_2>kP_A$$

the movable element will close the nozzle $B_1$ and the output pressure will be equal to $P_A$. When $$P_1+P_3-P_2<kP_A$$

the movable element will take up the inoperative position, the output pressure being zero (atmospheric pressure through the open nozzle $B_1$). We have thus provided a comparator. By connecting in parallel a number of cells adjusted to variable return pressures $kP_A$, an analogue-to-digital converter for the measurement $P_1+P_3-P_2$ is provided.

It was readily be appreciated that it is possible to vary the expression of the sum to be compared by manipulating the relative surfaces of the various diaphragms and the choice and number of the chambers into which the control pressures are introduced.

More especially, for digital signals, where the ratio S:s is made very slightly higher than 1:1, the pressure $P_2$, $P_3$ being zero, the comparator performs the function of an amplifier, i.e., a very weak signal $P_1$ gives rise to an output signal $P_s$ of the maximum value $P_s=P_A=1$.

Figure 4:
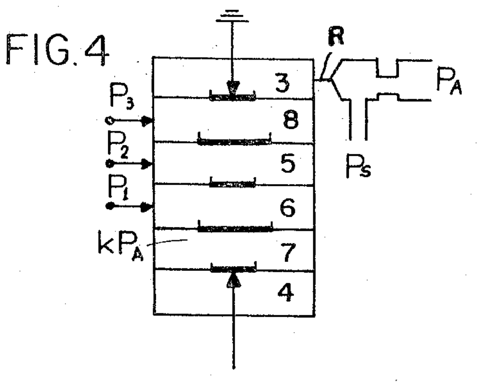
FIGURE 4 is an example of the use of the circuit according to FIGURE 3 combined with an amplifier of the nozzle-blade type.

FIGURE 4 shows an example of the combination of the elemental cell with an amplifier of the nozzle-blade type in which the function of the blade is performed by the chamber 3 of the elemental member. Depending upon the position of the movable unit, the chamber 3 communicates or does not communicate with the atmosphere through the nozzle $B_2$, and the signal is either amplified or negligible.

An important use of this combination is the digital-to-analogue conversion of any quantities represented in the form of digits. If the same chambers of a number of identical cells are connected in parallel at one end of a nozzle, these cells will perform a function identical to that of monostable electronic flip-flops. The digital quantity is here sent in the form of a pressure to a number of cells which symbolically represent values graded as a function of a certain coding, for example a binary coding.

It is known that a nozzle-blade type amplifier delivers at its output a pressure inversely proportional to the opening of the nozzle R, the opening of the nozzle being measured by the flow of the fluid passing through this nozzle. If the same chamber (for example, chamber 3) of each of a series of cells such as that of FIGURE 17, is connected with the nozzle of a single amplifier, the output pressure $P_S$ of the amplifier is inversely proportional to the flow in the nozzle, this flow being proportional to the number of the chambers 3 connected with the atmosphere, that is to the number of chambers not actuated when the bias is arranged so that each cell is normally in the open position. A digital quantity $P_1$ comprises a plurality of digits $P_{11}$, $P_{12}$, $P_{13}$, $P_{14}$, each digit representing a given component of the quantity, and the output pressure $P_S$ of the nozzle-blade type amplifier will be proportional to the number of actuated cells and such an arrangement actually constitutes a digital-to-analogue converter.

Figure 2:
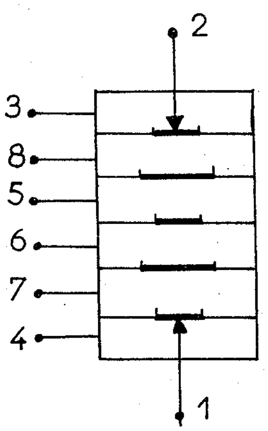
FIGURE 2 is the symbolic representation of the cell according to FIGURE 1.

The comparator according to FIGURE 2 operates both as an analogue signal comparator and as a digital signal comparator. Moreover, with digitals signals, it may have the function of a signal repeater ($P_2=P_3=0$) or of a relay ($P_3=0$, $K=0$).

As a digital signal comparator, it affords additional advantages to comparators which may be constructed with four-chamber cells without any return force. The presence of the two additional chambers makes it possible to obtain a system of characteristics which are variable as a function of the value of the pressure $P_3$ and of the coefficient K (see FIGURE 14).

On the other hand, four-chamber comparators have the defect of exhibiting lack of determination for the output value $P_s$ when the two pressures to be compared are equal (see FIGURE 15*a*, which shows the characteristic curve of $P_s$ as a function of the difference $P_1-P_2$ in the case of a four chamber comparator).

In the case of a six chamber comparator according to the invention, the characteristic curve has in fact a form known as a hysteresis curve 15*b* with a stable position $P_s=0$ for $P_1=P_2$ (with $P_3=0$). If $P_3$ is a constant pressure, the inoperative point may be either $P_s=0$ or $P_s=P_A$, depending upon the value of the difference $P_3-kP_A$ as is apparent from FIGURE 14.

Figure 9:
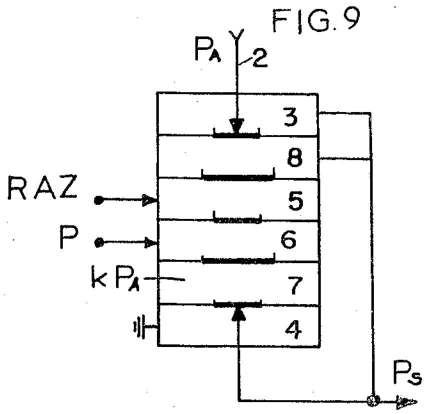
FIGURE 9 is an example of the formation of a memory or store.

The hysteresis shape of the characteristic curve will be understood by referring to FIGURE 15*b*, representing the characteristic curve of a cell connected, for example, as illustrated in FIGURE 3. For sake of clarity, it is assumed that $P_3=0$. When $P_1-P_2=0$, the biasing pressure $KP_A$ keeps the movable element in its upper position and the output pressure $P_S=0$. When $P_1-P_2$ reaches the value $KP_A$, the movable element starts moving with a certain speed which depends on its inertia, and the movable element reaches the lower position at a time when the value $P_1-P_2=n$. It is to be noted that as soon as the nozzle 2 is open the pressure $P_A$ in chamber 3 helps in accelerating the movement of the movable element. The inertia of the movable element is generally very small and owing to assisting pressure $P_A$ in chamber 3 the slope of the flank AN of the curve is almost vertical, as it is shown in FIGURE 14. Referring again to FIGURE 15*b*, where the pressure $P_1-P_2$ starts to decrease, and reaches again the value $KP_A$, the movable element does not move upward because of the presence of the pressure $P_A$ in chamber 3. The acting forces being $$(P_1-P_2)(S-s)-KP_A(S-s)+P_A(s)$$

the movable element will start moving when $$P_1-P_2=KP_A-\frac{s}{S-s}P_A=P_A\left(K-\frac{s}{S-s}\right)P_A\left(K-\frac{s}{S-s}\right)$$

is always smaller than $KP_A$ and the movable element will move when $P_1-P_2=m$ (point M of the curve) in the case of $K>s/S-s$ or $P_1-P_2=q$ (point Q of the curve) when $K<s/S-s$. Thus depending on the case the characteristic curve of the cell will be either ANMM′ or ANQQ′. It is pointed out that the hysteresis curve exists even if the nozzle $B_2$ is not fed with the pressure $P_A$ owing to the slope of the flank AN but the width of the characteristic curve depends essentially on the presence of the pressure $P_A$. It will be seen hereinafter that the width of the curve may be still increased by connecting a further chamber to the output of chamber 3, for example, as illustrated in FIGURE 9.

The six-chamber cell comparator has in addition the advantage that it does not require very accurate finishing in the positioning of the nozzles, such accuracy being fundamental to four-cell comparators owing to the instability of the latter when $P_1=P_2$.

Figure 5:
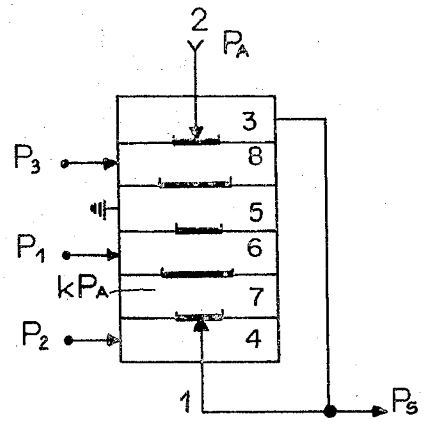
FIGURE 5 is an example of the production of the logical sum of three variables.

FIGURE 5 and the following figures give a number of examples of the use of these cells as logical computing elements. In these examples, all the control pressures can take only one of two values 0 and $P_A$ (digital signals).

The connection of the cell in accordance with FIGURE 5 makes it possible to produce the logical sum of three variables $P_1$, $P_2$ and $P_3$. The logical sum is obtained when the existence of at least any one of the three pressures produces the dispatch of an output signal $P_s$. In order to do this, two of these pressures are sent into the even chambers 6 and 8, the third being sent into the chamber 4, while one of the odd chambers 5 is connected to the atmosphere, the other 7 receiving the return pressure $kP_A$. This is the pneumatic form of the "OR" cell known to electronics engineers.

Figure 6:
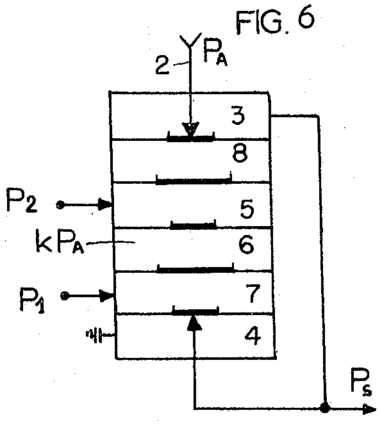
FIGURE 6 is an example of the production of the logical product of two inverses.

The connection of the cell in accordance with FIGURE 6 represents an example of the performance of the so-called inversion operation. This operation consists in obtaining a signal when the cell is in the inoperative state and in cutting off this signal as soon as one or more control pressures are set up. It is symbolically written $$Ps=\overline{P_1}+\overline{P_2}$$

It will be seen that in the absence of control pressure (neither $P_1$ nor $P_2$) the movable unit closes the nozzle $B_1$. An output signal $Ps$ therefore passes through the duct connecting the chambers 3 and 1. As soon as one of the control pressures is introduced into an odd chamber, the movable unit changes over, thus connecting the output duct to the atmosphere. This is the form of the "nor" cell known to electronics engineers.

Such connections, in which the output signal is a function of the algebraic sum of a number of pressures, may, therefore, be used as elemental discriminators for control loops.

Figure 7:
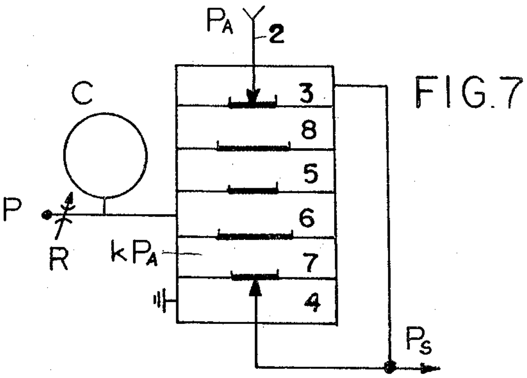
FIGURE 7 is an example of the production of a delay.

The arrangement according to FIGURE 7 combines the elemental cell with a delay device. There is provided in the circuit for the admission of the control pressure, of which it is desired to delay the action, an adjustable throttling R, and a reservoir C is connected in parallel. This device has the effect of inclining the generally very steep front of the pressure wave constituting the control signal. This assembly RC increases the time of the pressure rise proportionally to $$1-e-\frac{t}{RC}$$

i.e. proportionally to RC in the substantially linear useful part of the corresponding curve. The change-over of the movable unit, which takes place only from a threshold fixed by the pressure $kP_A$, will therefore be delayed by the time necessary for the pressure of the control signal to reach this threshold. By varying R or C, the duration of the delay will be modified.

Figure 8:
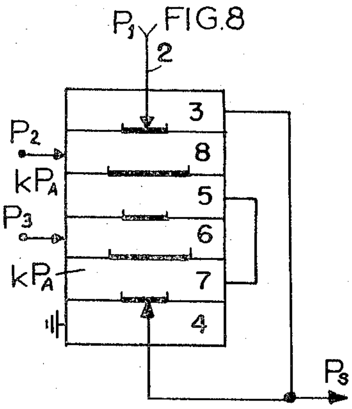
FIGURE 8 is an example of the formation of the logical product of three variables.

FIGURE 8 provides an example of the formation of the logical product of three variables, that is to say, a signal is obtained when the three control pressures, representing these three variables, exist simultaneously in the respective chambers. This device provides the equivalent of the "AND" cell known to electronics engineers. The pressures $P_3$, $P_2$ and $P_1$ arrive at the two even chambers 6 and 8 and at the nozzle $B_2$ respectively, the odd chambers 5 and 7 being connected to the return pressure $kP_A$, the chamber 4 being connected to the atmosphere. In this embodiment in the static condition with $P_2$ or $P_3$ equal to 0, nozzle $B_2$ will be closed due to the bias pressure $2kP_A$ which is greater than $P_2$ or $P_3$ but less than $P_2+P_3$. Thus, the output $P_S$ will be at atmospheric pressure. However, with both $P_2$ and $P_3$ applied, the cell will be actuated and chamber 3 will be connected to the output. If under these conditions $P_1$ is applied an output $P_S$ equal to $P_1$ will occur; if $P_1$ is not applied, no output will occur. It should be noted that $P_2$ need not equal $P_3$ nor $P_1$ so long as $P_2+P_3$ is greater than $2kP_a$.

FIGURE 9 illustrates a very important element in control or computing equipment. This is the memory or store which, in the other systems at present known, necessitates a minimum of two cells. In order to provide the storage device, the chambers 8 and 3 and the nozzle $B_1$ are connected to the output duct, the signal P to be stored is introduced into the chamber 6, and the return-to-zero signal (RAZ) arrives at the chamber 5, the chamber 4 being connected to the atmosphere.

In the inoperative condition, the movable unit is subject to a force $kP_A(S-s)$ and closes the nozzle $B_2$. The output pressure $P_S$ extracted at $B_1$ is therefore equal to the atmospheric pressure. If an input signal P is applied at 6, the equilibrium is broken and the movable unit moves away from the nozzle $B_2$, the chambers 8 and 3 then becoming filled and accelerating the closure of the nozzle $B_1$. The output pressure is therefore equal to the supply pressure and retains this value even if P returns to zero.

As a matter of fact where the cell is open, that is when the movable element is in the lower position the various forces acting upon the movable elements are:

$$P(S-s)-KP_A(S-s)+P_A(S-s)+P_A(s)$$

When P returns to zero, a force equal to $$P_A[S-K(S-s)]$$

is still applied to the movable element which will start moving only when a return to zero signal (RAZ), greater than $$P_A\left(\frac{s}{S-s}-K\right)$$

is applied to the chamber 5. The characteristic curve of such a memory cell is similar to the curve illustrated in FIGURE 15*b* but with a still increased width.

FIGURES 10, 11, 12 and 13 give a number of constructional examples of pneumatic circuits performing the same functions as the well known electronic circuits.

These constructions are distinguished by the fact that these circuits comprise, apart from the pneumatic resistances and capacitances, only one type of elemental cell according to the invention. The application of these elemental cells makes it possible in addition to reduce the number of elements necessary for performing certain logical operations, owing to the fact that the so-called "memory" or store circuits require only one cell according to the invention and not at least two conventional cells.

Another advantage is provided by the high degree of standardisation rendered possible by the cell according to the invention, because in all these diagrams the chamber 8 and the nozzle $B_2$ are connected, apart from the combination of the cell according to the invention, to an amplifier of the "nozzle-blade" type.

Figure 10:
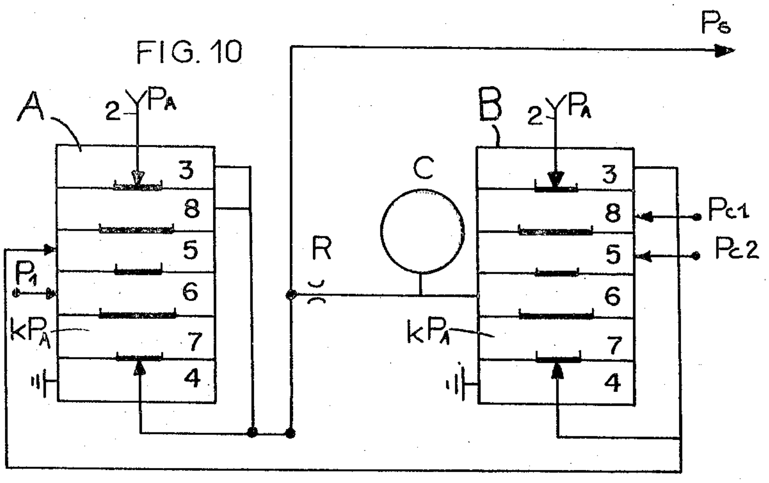
FIGURE 10 is an example of the construction of monostable circuit.

FIGURE 10 illustrates a monostable circuit obtained by combining the properties of a cell connected as a memory or store and of a delay device.

The introduction of a signal $P_1$ into an even chamber of the cell A produces, owing to the downward rocking of its movable unit, the passage of an output signal which is simultaneously to an even chamber of the cell B, through a delay system, and to an output P*s*.

This delay system produces after a predetermined time, the application of a signal to an odd chamber of the cell A, which signal returns the movable unit to its inoperative position, which is the only stable position. The circuit illustrated is simpler, but it is possible to use the additional chambers of the feedback amplifying cell B to modify the properties and the operating conditions of the monostable circuit by introducing additional input signals such as $P_{1c}$ and $P_{2c}$. It is thus possible, in accordance with the form of these signals, either to retain the monostable circuit in one position or the other, or to vary the reciprocal durations of the signal and of the dead time.

Figure 11:
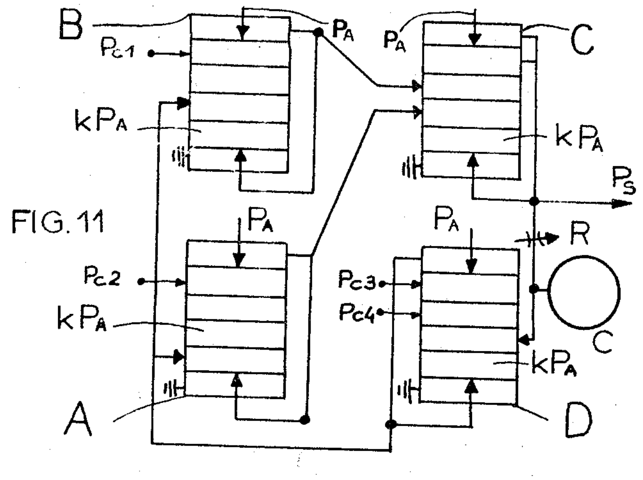
FIGURE 11 is an example of the construction of a multivibrator circuit.

FIGURE 11 is a multivibrator circuit. It utilises four cells and a delay system. The frequency of the oscillations is a function of the response times of the cells and of the delay, i.e. of the product RC previously defined. The operating cycle of the circuit is as follows: the supply inlets being under pressure, the cell A supplies a signal which is sent to an even chamber of the cell C, of which the movable unit changes over and supplies in turn a signal which on the one hand is delivered at P*s* and on the other hand actuates a cell D provided with a delay device. The latter, after a predetermined time, sends a pulse which cuts off the output signal at the cell A and changes over the movable unit of the cell B, which in turn supplies a signal which, when introduced into an odd chamber of the cell C, closes the latter. The cell C in turn blocks the output signal P*s* and connects with the atmosphere the signal supplied by the chamber D producing the return to the initial state of the cells A and B, which are thus ready for a further cycle.

Here again, it is possible by means of auxiliary signals either to retain the multivibrator in one of its positions (pressure $P_{c1}$ or $P_{c2}$ in the remaining odd chamber of the cell A or of the cell B), or to vary the period of the multivibrator or the form of the output signal (pressures $P_{c3}$ and/or $P_{c4}$ in the remaining chambers of the cell D).

Figure 12:
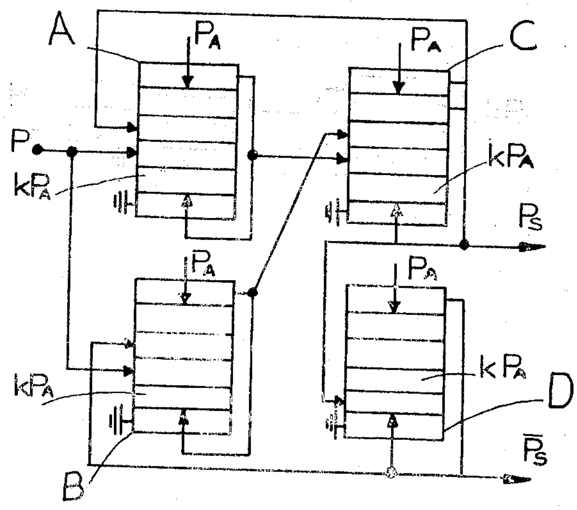
FIGURE 12 is an example of the construction of a bistable circuit.

FIGURE 12 illustrates a bistable circuit utilising four cells. Its cycle is as follows: an input signal is simultaneously sent to an even chamber of each of the cells A and B. This signal produces the despatch of a pressure into an odd chamber, in the present instance the chamber 5, of the cell C, which then supplies an output signal P*s* and simultaneously despatches a pressure to an odd chamber, in the present example the chamber 5, of the cell D, which in turn supplies a signal complementary to P*s*.

Figure 13:
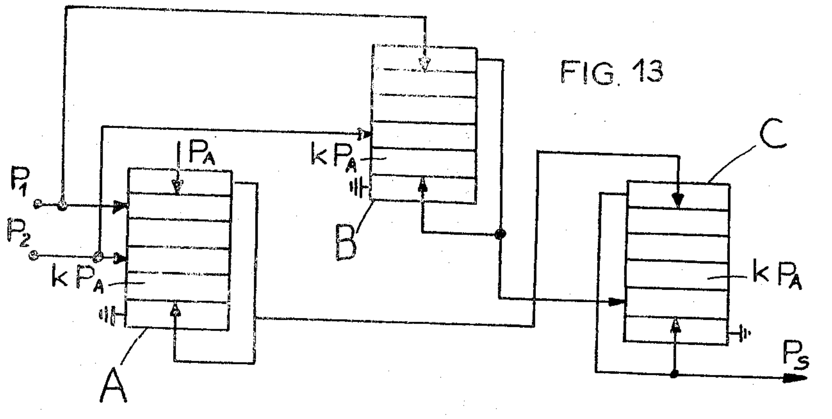
FIGURE 13 is an example of the construction of a dilemma circuit.

FIGURE 13 illustrates a dilemma circuit, i.e. a three-cell circuit which represents the logical so-called "dilemma" function, which is written: $Ps=(P_1 \cdot P_2)+(P_2 \cdot P_1)$ that is to say, an output pressure is obtained when only one of the two control pressures $P_1$ and $P_2$ arrives, with the exclusion of a simultaneous arrival. Its operation is as follows: the control pressure $P_1$ is simultaneously sent to an even chamber of the cell A and to the supply nozzle $B_2$ of the cell B. The control pressure $P_2$ is simultaneously dispatched to an even chamber of each of the cells A and B.

The cell A is connected as an "OR" cell, of which the output feeds the supply nozzle B2 of the cell C. The cell B is connected as an "AND" cell and its output signal is transmitted to an odd chamber, in the present case the chamber 7 of the cell C. It will thus be seen that there can only be an output signal from the cell C if the nozzle B2 is fed (existence of $P_1$ or $P_2$) and if the chamber 7 is connected to the atmosphere (no simultaneity of $P_1$ and $P_2$). Here again, secondary connections to the unused chambers make it possible to vary the operating conditions of the whole arrangement (blocking, delay, etc.).

In conclusion, it will be seen that these cells can replace electronic devices in all operations not requiring excessively high response speeds, which is the case in the majority of servomechanisms. All the examples given have been chosen with six-chamber cells.

All the examples given above have been so chosen as to demonstrate the possibilities of the cells according to the invention, i.e. of six-chamber cells having variable-surface diaphragms, comprising at least one chamber into which there is introduced a constant pressure creating a return force.

These cells afford the advantages hereinbefore described in pneumatic circuits employed to resolve the usual functions of present-day modern arrangements.

For particular applications such as, for example, functions involving a large number of variables, it is obvious that it is possible without departing from the scope of the invention to use cells having a larger number of chambers, six being the minimum number of chambers by means of which it is possible, together with the known logical elements, to perform certain functions such as the analogue or digital comparator function or the "memory" or store function.

What is claimed is:

1. In a pneumatic logical circuit including bias means for supplying a fluid with a constant selective biasing pressure and control means for supplying fluids at signal pressures, a logical cell, comprising:

a series of six chambers disposed contiguously, consecutive chambers having common partition means including diaphragm means therebetween, said diaphragm means of first alternate ones of said partition means having active areas of a first size and the diaphragm means of the remaining ones of said partition means having active areas of a second size larger than said first size in a predetermined ratio, a movable substantially rigid element mechanically connecting together said active areas of the diaphragm means and having a first end part and a second end part extending respectively into the first and the last of said series of chambers, said first chamber in said series including first nozzle means and said first end part including closing means operable to close said first nozzle means upon displacement of the movable element toward said first nozzle means, said last chamber in said series including second nozzle means forming an output and said second end part including closing means operable to close said second nozzle means upon displacement of the movable element toward said second nozzle means, the chambers having a smaller active area diaphragm means forming a partition thereof facing said first nozzle means being called "even chambers," the other chambers being called "odd chambers," at least one odd chamber having an input connection supplied with said fluid at said biasing pressure, at least one odd chamber having a signal input connection supplied with one of said fluids at signal pressures, at least one chamber other than said first chamber being open to the atmosphere and said first chamber being connected with said output.

2. The combination defined in claim 1 wherein at least two even chambers have a signal input connection supplied with one of said fluids at signal pressures.

3. In a pneumatic logical circuit including means for supplying a fluid with a constant feeding pressure, means for supplying a fluid at a constant biasing pressure lower than said feeding pressure and means for supplying fluids at signal pressures, a logical cell, comprising:

a series of six chambers disposed contiguously, consecutive chambers having common partition means including diaphragm means therebetween, said diaphragm means of first alternate ones of said partition means having active areas of a first size and the diaphragm means of the remaining ones of said partition means having active areas of a second size larger than said first size in a predetermined ratio, a movable substantially rigid element mechanically connecting together said active areas of the diaphragm means and having a first end part and a second end part extending respectively into the first and the last of said series of chambers, said first chamber in said series including first nozzle means forming input means supplied with said feeding pressure and said first end part including closing means within said first chamber operable to close said first nozzle means upon displacement of the movable element in the direction thereof, said last chamber including second nozzle means forming an output and said second end part including closing means within said last chamber operable to close said second nozzle means upon displacement of the movable element in the direction thereof, the chambers having a smaller active area diaphragm means forming a partition thereof facing said first nozzle means being called "even chambers," the other chambers being called "odd chambers,"

at least one odd chamber having a bias input connection supplied with said biasing pressure, at least one even chamber having a signal input connection supplied with one of said signal pressures, at least one chamber other than said first chamber being open to the atmosphere, and said first chamber being connected with said output.

4. In a pneumatic logical circuit, a logical cell as claimed in claim 3, wherein the chamber open to the atmosphere is said last chamber.

5. In a pneumatic logical circuit a logical cell as claimed in claim 4, wherein said first chamber connected with said output is an odd chamber, the other odd chambers having bias input connections and at least two even chambers having signal input connections, the last chamber being open to the atmosphere.

6. The combination defined in claim 3 wherein at least two even chambers have a signal input connection supplied with one of said signal pressures.

7. The combination defined in claim 6 wherein said last chamber has a signal input connection supplied with one of said signal pressures.

8. In a pneumatic logical circuit including means for supplying a fluid with a constant feeding pressure, means for supplying a fluid at a constant biasing pressure lower than said feeding pressure and means for supplying fluids at signal pressures, a logical cell, comprising:

a series of six chambers disposed contiguously, consecutive chambers having common partition means including diaphragm means therebetween, said diaphragm means of first alternate ones of said partition means having active areas of a first size and the diaphragm means of the remaining ones of said partition means having active areas of a second size larger than said first size in a predetermined ratio, a movable substantially rigid element mechanically connecting together said active areas of the diaphragm means and having a first end part and a second end part extending respectively into the first and the last of said series of chambers, said first chamber in said series including first nozzle means forming input means supplied with said feeding pressure and said first end part including closing means within said first chamber operable to close said first nozzle means upon displacement of the movable element toward said first nozzle means, said last chamber including second nozzle means forming an output and said second end part including closing means within said last chamber arranged to close said second nozzle means upon displacement of the movable element toward said second nozzle means, the chambers having a smaller active area diaphragm means forming a partition thereof facing said first nozzle means being called "even chambers," the other chambers being called "odd chambers,"

said first chamber being connected with said output, one even chamber having a bias input connection supplied with said biasing pressure, another even chamber being open to the atmosphere, and the odd chambers other than said first chamber having separate signal input connections.

9. In a pneumatic logical circuit including means for supplying a fluid with a constant feeding pressure, means for supplying a fluid at a constant biasing pressure lower than said feeding pressure and means for supplying fluids at signal pressures, a logical cell, comprising:

a series of six chambers disposed contiguously, consecutive chambers having common partition means including diaphragm means therebetween, said diaphragm means of first alternate ones of said partition means having active areas of a first size and the diaphragm means of the remaining ones of said partition means having active areas of a second size larger than said first size in a predetermined ratio, a movable substantially rigid element mechanically connecting together said active areas of the diaphragm means and having a first end part and a second end part extending respectively into the first and the last of said series of chambers, said first chamber in said series including first nozzle means forming input means supplied with said feeding pressure and said first end part including closing means within said first chamber operable to close said first nozzle means upon displacement of the movable element toward said first nozzle means, said last chamber including second nozzle means forming an output and said second end part including closing means within said last chamber operable to close said second nozzle means upon displacement of the movable element toward said second nozzle means, the chambers having a smaller active area diaphragm forming a partition thereof facing said first nozzle means being called "even chambers," and the other chambers being called "off chambers,"

said first chamber being connected with said output, said last chamber being open to the atmosphere, one odd chamber having a bias input connection, one even chamber having a signal input connection, another even chamber being connected with said output, and another odd chamber having a signal input connection.

10. In a pneumatic logical circuit including bias means for supplying a fluid with a constant selective biasing pressure and control means for supplying fluids at signal pressures, a logical cell, comprising:

a series of six chambers disposed contiguously, consecutive chambers having common partition means including diaphragm means therebetween, said diaphragm means of first alternate ones of said partition means having active areas of a first size and the diaphragm means of the remaining ones of said partition means having active areas of a second size larger than said first size in a predetermined ratio, a movable substantially rigid element mechanically connecting together said active areas of the diaphragm means and having a first end part and a second end part extending respectively into the first and the last of said series of chambers, said first chamber in said series including first nozzle means and said first end part including closing means within said first chamber operable to close said first nozzle means upon displacement of the movable element toward said first nozzle means, said last chamber in said series including second nozzle means and said second end part including closing means within said last chamber arranged to close said second nozzle means upon displacement of the movable element toward said second nozzle means, the chambers having a smaller active area diaphragm forming a partition thereof facing said first nozzle means being called "even chambers," the other chambers being called "odd chambers," each of said chambers being provided with means for applying fluid thereto at a desired pressure, at least one chamber of one parity being supplied with said biasing pressure from said biasing means, and at least one chamber of the other parity having a signal input connection supplied with one of said signal pressures from said control means.

References Cited by the Examiner

UNITED STATES PATENTS

| | | | |
|---|---|---|---|
| 2,712,321 | 7/1955 | Grogan | 137—86 |
| 2,774,367 | 12/1956 | Grogan | 137—86 |
| 2,864,399 | 12/1958 | Hartz | 137—85 X |
| 2,935,077 | 5/1960 | Keyser | 137—82 |

FOREIGN PATENTS

| | | |
|---|---|---|
| 121,289 | 1959 | Russia. |
| 134,917 | 1961 | Russia. |
| 150,309 | 1962 | Russia. |

OTHER REFERENCES

Berends et al.: (1), "International Federation of Automatic Control," Trudy Mezhdunarodnago Kongressa, 1st, Moscow 1959, pp. 431–448.

Berends et al.: (2), "Pneumatic Switching Circuits," Automatic and Remote Control, vol. 20, No. 11, Sept. 1958, pp. 1446–1457.

Mitchell et al.: Fluid Logic Devices and Circuits, Transactions of the Society of Instrument Technology, Feb. 26, 1963.

RICHARD B. WILKINSON, *Primary Examiner.*

LEO SMILOW, LOUIS J. CAPOZI, *Examiners.*

WAYNE F. BAUER, *Assistant Examiner.*

UNITED STATES PATENT OFFICE

CERTIFICATE OF CORRECTION

Patent No. 3,303,999 February 14, 1967

Marcel Mamy

It is certified that error appears in the above identified patent and that said Letters Patent are hereby corrected as shown below:

Column 9, line 21, "odd" should read -- even --.

Signed and sealed this 22nd day of December 1970.

(SEAL)
Attest:

Edward M. Fletcher, Jr.
Attesting Officer

WILLIAM E. SCHUYLER, JR.
Commissioner of Patents